US006771262B2

(12) United States Patent
Krishnan

(10) Patent No.: US 6,771,262 B2
(45) Date of Patent: *Aug. 3, 2004

(54) SYSTEM AND METHOD FOR VOLUME RENDERING-BASED SEGMENTATION

(75) Inventor: Arun Krishnan, Edison, NJ (US)

(73) Assignee: Siemens Corporate Research, Inc., Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,515

(22) Filed: Nov. 25, 1998

(65) Prior Publication Data

US 2001/0055016 A1 Dec. 27, 2001

(51) Int. Cl.[7] .............................................. G06T 17/00
(52) U.S. Cl. ..................................... 345/424; 600/407
(58) Field of Search ............................... 345/423, 418, 345/419, 424; 600/407, 411

(56) References Cited

U.S. PATENT DOCUMENTS

| | | | | |
|---|---|---|---|---|
| 4,729,098 A | * | 3/1988 | Cline et al. .................. 345/421 |
| 4,835,712 A | * | 5/1989 | Drebin et al. ................ 364/518 |
| 5,555,352 A | * | 9/1996 | Lucas ............................ 345/423 |
| 5,782,762 A | | 7/1998 | Vining .......................... 600/407 |
| 5,914,721 A | * | 6/1999 | Lim ............................... 345/421 |
| 5,971,767 A | * | 10/1999 | Kaufman et al. ........... 434/267 |
| 6,016,439 A | * | 1/2000 | Acker ........................... 600/411 |
| 6,083,162 A | * | 7/2000 | Vinning ........................ 600/407 |

* cited by examiner

Primary Examiner—Don Wong
Assistant Examiner—Huedung X. Cao
(74) Attorney, Agent, or Firm—Donald B. Paschburg; F. Chau & Associates, LLP

(57) ABSTRACT

A three-dimensional (3D) imaging system and method include a processor for generating a volume-rendered 3D image on a display using a plurality of voxels from a 3D image dataset; and a view selector which responds to user inputs for determining a first set of voxels corresponding to a boundary in the volume-rendered 3D image using a predetermined boundary-specifying criteria applied to a function of the opacity of the plurality of voxels. The processor responds to the first set and to a user function selection by performing the selected function to modify the volume-rendered 3D image relative to the detected boundaries. The selected function is a display function, a measurement function, or a segmentation function. The view selector determines the boundary from voxels having opacities greater than a predetermined threshold, or determines the boundary from voxels having a gradient in opacities greater than a predetermined threshold. Alternatively, the view selector determines the boundary from voxels having a greatest contribution to a total intensity which is a function of the opacities of the voxels, or determines the boundary from voxels having respective contributions greater than a predetermined threshold, with such contributions being to a total intensity which is a function of the opacities of the voxels.

20 Claims, 4 Drawing Sheets

SYSTEM AND METHOD FOR VOLUME RENDERING-BASED SEGMENTATION

BACKGROUND OF THE INVENTION

The present invention relates to three-dimensional graphics and, more particularly, to a system and method for combining volume rendering and segmentation in three-dimensional graphics generation.

In three-dimensional (3D) imaging, segmentation is employed, which is a process for identifying, outlining, and/or demarcating volumes of interest from a 3D volume dataset. The volumes of interest in a 3D medical application, such as tomographic analysis, are typically organs. Segmentation may be used for measurements of, for example, the diameter of a blood vessel or other tubular tissues of a patient. In addition, segmentation may be used to navigate through space, including virtual space, with the boundary regions of a segmented organ being used for automatic navigation. Through segmentation, visualization of organs may be performed, in which segmented organs are converted into surface models which may be rendered at a high frame rate using graphics computers and/or software.

Segmentation may be performed using various techniques, such as simple thresholds applied on the entire volume of the 3D image, for example, to segment bones. Also, adaptive thresholds may be used to prevent "bleeding" from one portion of the 3D image to another. In addition, contours may be drawn on every slice of the object being imaged, such as an organ. Such segments are then displayed for viewing by the viewer.

Volume rendering is also performed in 3D imaging, in which the intensity values of the voxels of the 3D image are converted into opacity values using a specified mapping. Other possible mappings include intensity to (color plus) opacity as well as intensity gradient to opacity. The opacity values are then used to render the entire volume or a part thereof on a display screen. Each screen pixel is assigned a particular value depending on the opacity of all of the voxels which are projected onto the respective screen pixel. A user typically adjusts the mapping of intensity to opacity, for example, to enhance features, and/or the user may change the viewing position and/or direction to change the displayed view, which may necessitate redrawing the 3D image and updating the intensity and opacity values.

It is known that visualization and segmentation of 3D images may be combined to allow a user to interactively view the segmentation and to interactively guide the segmentation process. Such combinations have employed segmentation using global thresholds and visualization using surface shaded displays.

Heretofore, volume rendering and segmentation have not been effectively combined since volume rendering did not permit functions or tools such as measurement, automatic navigation, etc. through a 3D image, while traditional surface rendering methods using pre-segmented data could perform such functions or tools.

Thus, there is a need for a volume rendering system and method which provides such functions as measurement and automatic navigation.

SUMMARY OF THE INVENTION

A three-dimensional (3D) imaging system and method include a processor for generating a volume-rendered 3D image on a display using a plurality of voxels from a 3D image dataset; and a view selector which responds to user inputs for determining a first set of voxels corresponding to a boundary in the volume-rendered 3D image using a predetermined boundary-specifying criteria applied to a function of the opacity of the plurality of voxels. The processor responds to the first set and to a user function selection by performing the selected function to modify the volume-rendered 3D image relative to the detected boundaries. The selected function is a display function, a measurement function, or a segmentation function. The view selector determines the boundary from voxels having opacities greater than a predetermined threshold, or determines the boundary from voxels having a gradient in opacities greater than a predetermined threshold. Alternatively, the view selector determines the boundary from voxels having a greatest contribution to a total intensity which is a function of the opacities of the voxels, or determines the boundary from voxels having respective contributions greater than a predetermined threshold, with such contributions being to a total intensity which is a function of the opacities of the voxels.

The disclosed system allows a user to manipulate the opacity mappings using trapezoids, sliders, etc. to be used to segment the volume. The system takes advantage of the fact that, when a user changes parameters to highlight a particular region, such parameters are sufficient to automatically determine which 3D points the user is actually looking at. It is also possible to restrict the volume of interest using, for example, cutplanes and other known volume region-selecting techniques, and then the disclosed system is applied to such a restricted volume.

DETAILED DESCRIPTION OF THE PREFERRED EMBODIMENT

Figure 1:
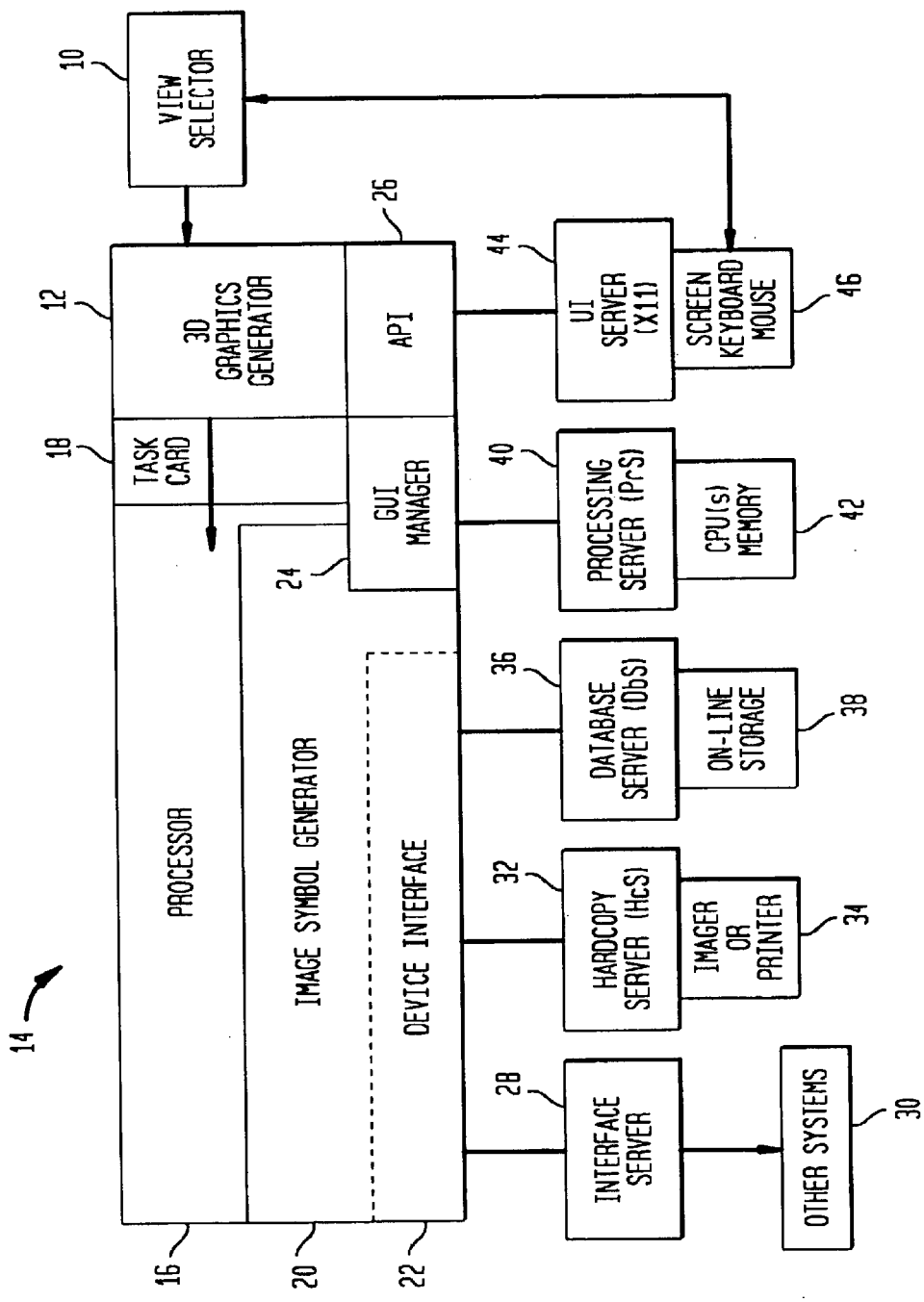
FIG. 1 illustrates a 3D graphics system incorporating the principles of the present invention.

Referring now to FIG. 1, a view selector system 10 and method according to the present invention are used in volume rendering-based segmentation for controlling opacity values during volume rendering and segmentation in the visualization of three-dimensional (3D) images. The view selector 10 is connected to a 3D graphics generator 12 of a 3D graphics system 14 having a processor 16. The 3D graphics generator 12 interacts with the processor 16 through, for example, a task card 18 or other functions or subroutines to generate and display 3D images on a screen or other output devices, for example, as 2D representations of the 3D images. Alternatively, 3D imaging using, for example, stereographic techniques such as 3D volumetric displays and eyewear, such as 3D glasses, may allow the user to view the 3D image on a substantially 2D display screen. The processor 16 operates with an image symbol generator 20 which may be a collection of software objects for representing imaging symbols on the output screen which may be easily understood by users of the 3D graphics system 14.

The processor 16 also includes a device interface 22, a graphic user interface (GUI) manager 24, and an application program interface (API) 26, with such components 22–26 connected to and respectively interfacing with an interface server 28 to interact with other systems 30, such as the Internet for remote communications; a hardcopy server (HcS) 32 for sending outputs to an imager or printer 34 for hardcopy outputs; a database server (DbS) 36 for storing data, for example, in on-line storage 38; a processing server (PrS) 40 for storing data in the memory 42 of the processor 16 or other central processing units (CPUs); and a user interface (UI) server 44 using, for example, the X WINDOWS protocol such as version 11 (X11) to interface with at least one input and/or output (I/O) device 46 such as a display screen, a keyboard, and/or a mouse.

In a preferred embodiment, the 3D graphics generator 12 is the FLY THROUGH software commercially available from SEMENS MEDICAL SYSTEMS, INC. of Iselin, N.J., which runs on a workstation as the 3D graphics system 14 such as the PROMINENCE workstation distributed by SIEMENS MEDICAL SYSTEMS, INC. of Iselin, N.J., which is an advanced medical viewing and post-processing workstation manufactured by ISG TECHNOLOGIES of Canada. The GUI for using the FLY THROUGH software may be implemented on a SIENET MAGICVIEW CT/MR Satellite Console, available from SIEMENS CORPORATION, to operate as the I/O device 46. Alternatively, the graphics system described in U.S. Pat. No. 5,782,762 to Vining and/or U.S. Pat. No. 5,825,909 of Jang, which are incorporated herein by reference, may be used as the 3D graphics system 14.

For 3D medical graphic imaging, the image symbol generator 20 may be the META 4 collection of software objects which metaphorically represent medical imaging symbols on the UI of the I/O device 46 which are easily understood by users. The device interface 22 may be a set of Digital Imaging and Communications in Medicine (DICOM) communication interface objects, and the interface server 28 may be a DICOM-based server which may interface with medical systems 30 such as computer-aided tomography (CAT) scanners and X-ray machines. Also, the GUI manager 24 may be the MOTIF manager for X WINDOWS, and the API 26 may be the Open Graphics Library (OpenGL) standard graphics API.

The 3D graphics generator 12 may include a segmentation module, a model builder module, and an interactive display module. The segmentation module segments out different organs of interest, and generates a segmented volume dataset. The model builder module converts the segmented volume dataset into a set of segmented polyhedral models which allows for real-time display by the interactive display module. Through the GUI of the I/O device 46, the user may be presented with a screen having three different view windows 48–52, shown in FIG. 2, as well as a portion 54 of the screen presenting a control panel of selectable tasks and scrollable task bars. When using an endoscopic medical application, a global view window 48 shows the various 3D segmented organ models as well as a depiction of the endoscope, which may be generated by computer tomography or magnetic resonance scanning of a patient. An endoscope view window 50 shows a 3D simulated view of the segmented organ models as seen from the tip of the endoscope within the organs of the patient. The correlation view window 52 shows a multi-planar reconstruction (MPR) plane passing through the endoscope tip position, or shows the original patient image to be correlated to the endoscope.

As shown in FIG. 1, the I/O device 46 may optionally be connected to the view selector 10 for receiving user inputs to control the selection and orientation of views as the user views the windows 48–52 to navigate through the 3D images shown in the windows 48–52.

The view selector system 10 may be hardware and/or software, and may be incorporated into the 3D graphics generator 12 as a subroutine, or may be remotely positioned relative to the 3D graphics system 14; for example, the view selector system 10 may be a separate workstation connected to the 3D graphics generator 12 or may be a personal computer in communication with the 3D graphics generator 12 over a network, such as the Internet.

Figure 2:
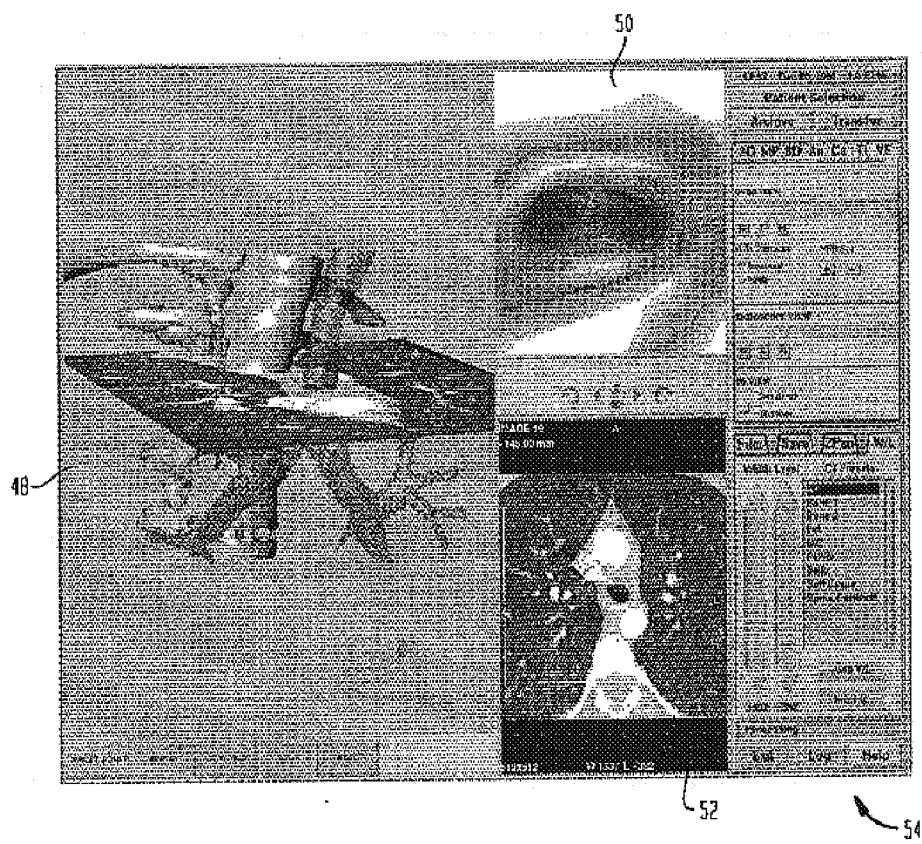
FIG. 2 illustrates a graphic user interface for the 3D graphics system of FIG. 1.
Figure 3:
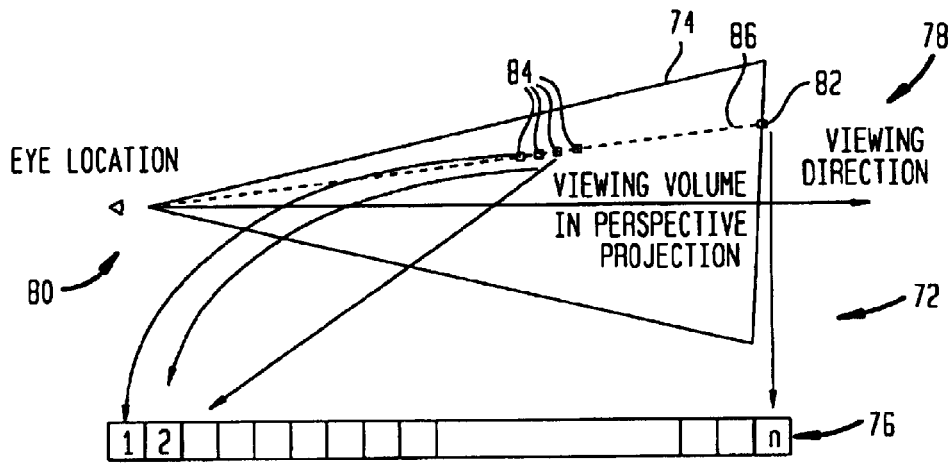
FIG. 3 illustrates a flowchart of the method of operation of the 3D graphics system.

The view selector system 10 operates in conjunction with the 3D graphics generator 12 using the method shown in FIG. 3. The 3D graphics generator 12 receives user inputs in step 56 through the GUI of the I/O device 46, such as the windows 48–54 shown in FIG. 2, or alternatively through the view selector system 10, to select the viewpoint. The 3D graphics generator 12 then generates or causes the processor 16 to generate a volume rendering in step 58 from the selected viewpoint. For example, after a user places a GUI cursor, such as a mouse-responsive pointing arrow, in a particular location on the GUI, such as the window 50, the 3D graphics generator 12 responds by modifying the volume rendering to conform to the selected viewpoint.

The view selector system 10 then receives, in step 60, voxels values and corresponding opacity values of the volume rendering generated in step 58 for a point in the volume rendering picked by the user, according to a mapping described with reference to FIG. 4. The view selector system 10 determines in step 62 the existence, if any, of a boundary from the opacity values for the picked point, and then performs a selected function in step 64 in response to additional user inputs or selections based on the boundary determined from the opacity values in step 62. For example, step 64 may include any or all of the functions of navigation 66, measurement 68, segmentation 70, and registration 71.

Figure 4:
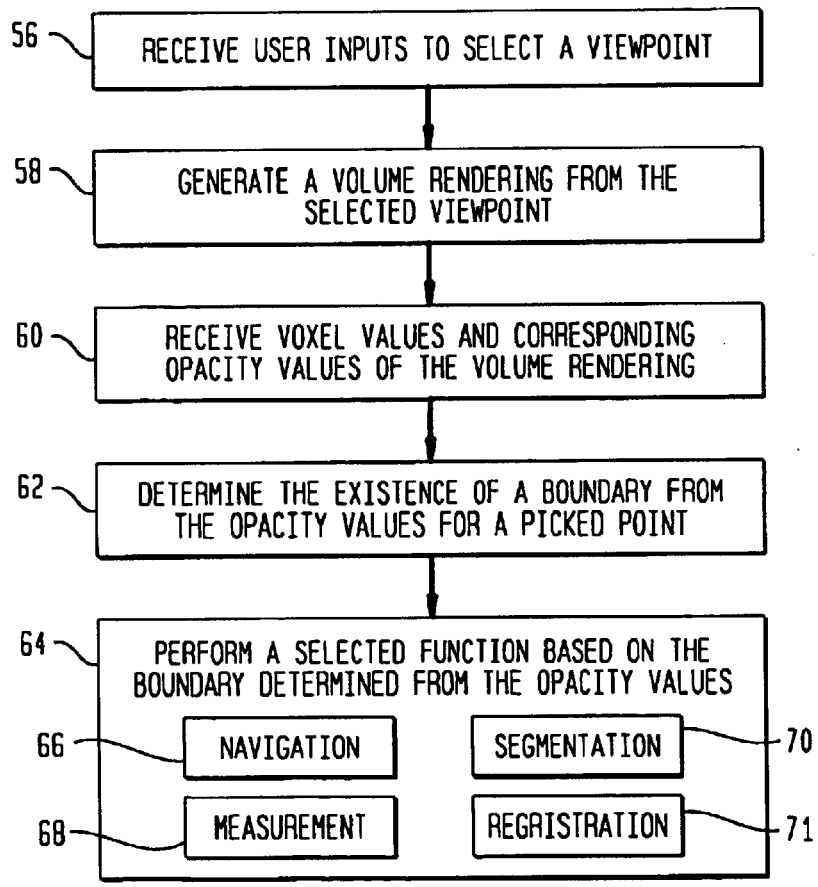
FIG. 4 illustrates a mapping of voxels with opacity values in accordance with one aspect of the invention.

Referring to FIG. 4, the view selector system 10 receives voxel values and corresponding opacity values in step 60 based on the mapping 72 from a viewing volume 74 to a set 76 of opacity values indexed by voxel values. The viewing volume 74 from a perspective projection is determined by the viewing direction 78 corresponding to the viewpoint of an eye location 80; that is, the perspective chosen in generating the 3D image by the 3D graphics generator 12, such as the endoscopic perspective of a tubular passage in window 50 in FIG. 2. A picked point, such as the picked point 82, is specified by the user within the viewing volume 74 by responding to the user moving the cursor location using the GUI or other inputs received from the view selector system 10.

The set 84 of voxels along the ray 86 from the eye location 80 to the picked point 82 are evaluated, and the corresponding opacity values of the set 84 of voxels are mapped to the set 76 of opacity values stored in a register or other storage locations in a memory of the view selector 10 and/or the 3D imaging system 14. The picked point may be any point along the ray 86 from the eye location 80, and so, for example, the picked point may be the voxel shown at point 82 in FIG. 4. The voxels along the ray 86 and within the viewing volume 74 may be indexed from 1 to N, in which voxel 1 is closer to the viewer at the eye location 80, and voxel N is the farthest. Each voxel i, i=1 to N, is associated with an intensity $I_i$ and with an opacity $\alpha_i$.

The view selector system 10 then determines the existence of a boundary in step 62 along the ray 86 to the picked point 82, since the opacity mapping 72 and the voxel values provide enough information to determine a boundary location according to a predetermined boundary criteria. In a preferred embodiment, the boundary $b_1$ is the voxel located at the nearest voxel along the ray 86, in which the opacity is over a predetermined opacity threshold T, such as 0.9 on a scale from 0 to 1, in which 0 corresponds to transparent or no opacity and 1 corresponds to complete opaqueness. Accordingly, the boundary $b_i$ is:

$$b_1 = v_j \text{ such that } j = \min k, \; \forall \alpha_k > T; \; k = 1 \ldots N. \quad (1)$$

In a second embodiment, the boundary may be determined to be at the location where the opacity gradient between successive voxels is greater than a predetermined gradient threshold G, and so:

$$b_2 = v_j \text{ such that } |\alpha_j - \alpha_{j-1}| > G; j=1 \ldots N, \quad (2)$$

or alternatively, the minimum j satisfying the above gradient threshold condition determines the boundary at the voxel $v_j$.

In a third embodiment, a final intensity of the volume-rendered image observed at the eye location 80 is:

$$I_{OUT} = \alpha \times I_1 + \quad (3)$$
$$(1 - \alpha_1) \times \alpha_2 \times I_2 +$$
$$(1 - \alpha_1) \times (1 - \alpha_2) \times \alpha_3 \times I_3 + \ldots +$$
$$(1 - \alpha_1) \times (1 - \alpha_2) \times \ldots \times (1 - \alpha_{N-1}) \times \alpha_N \times I_N$$

with the $i^{TH}$ contribution $C_i$ to the total output intensity $I_{OUT}$ is:

$$C_i = \alpha_i \times I_i \times \prod_{j=1}^{i} (1 - \alpha_j). \quad (4)$$

The boundary $b_3$ may be determined to be the voxel having the greatest contribution to $I_{OUT}$, which may be determined to be:

$$b_3 = v_j \text{ such that } C_j = \max C_k; k=1 \ldots N. \quad (5)$$

In a fourth embodiment, the boundary $b_4$ is located to be the voxel nearest to the eye position 80 such that the added term $C_i$ in Equations (4)–(5) is greater than a threshold W; that is:

$$b_4 = v_j \text{ such that } j = \min k, \forall C_k > W; k=1 \ldots N. \quad (6)$$

In a fifth embodiment, the boundary $b_5$ is located to be the voxel nearest to the eye position 80 such that the sum of opacities of voxels from the eye position 80 to the boundary is greater than a threshold V; that is:

$$b_5 = v_j \text{ such that } j = \min k \text{ with } \left(\sum_{m=1}^{k} \alpha_m\right) > V; k=1 \ldots N. \quad (7)$$

Any of such boundary conditions, or a combination thereof may be used to determine the boundary in step 62 of FIG. 3, which then corresponds to surfaces of, for example, a body organ simulated in the volume rendered image. Such boundary conditions may then be input to the 3D graphics generator 12, such as FLY THROUGH, for further operations by the user.

Figure 5:
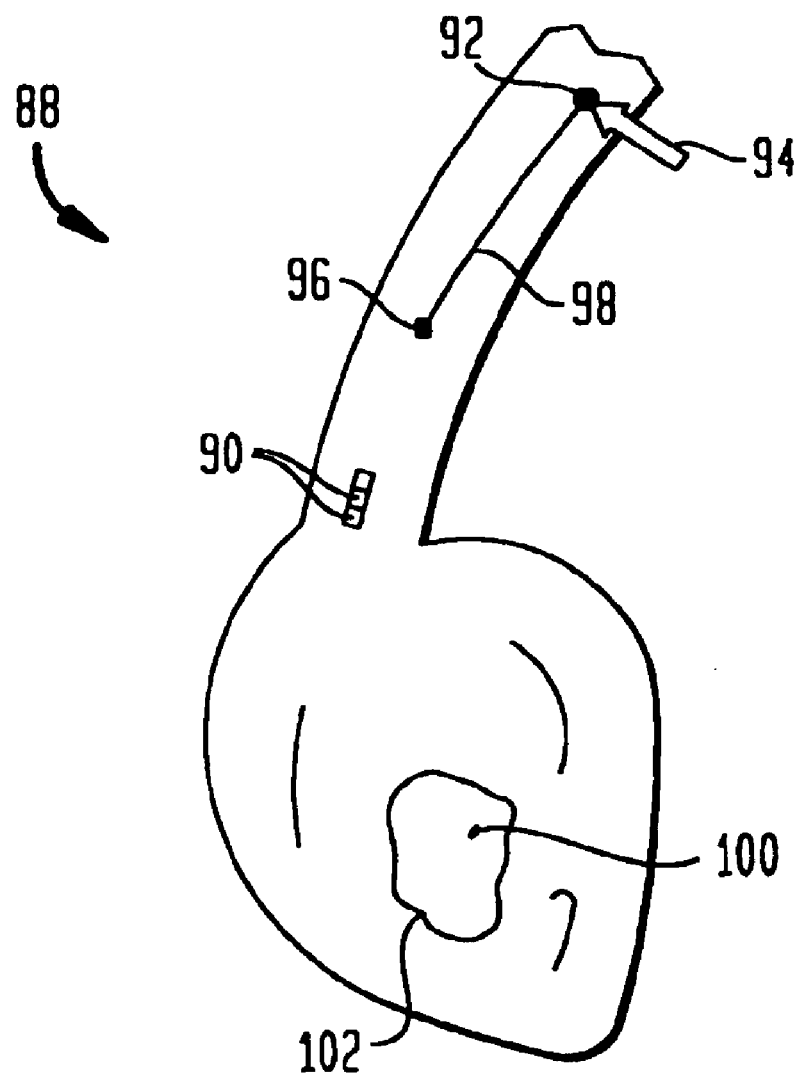
FIG. 5 illustrates a volume-rendered image with points picked for performing functions on the volume-rendered image.

Using the view selector system 10, the user may then select functions or tools in step 64 with the volume rendered 3D images without necessarily requiring the 3D image to be segmented beforehand. For example, as shown in FIG. 5 for a volume rendered image 88 of an aorta composed of a plurality of voxels 90 generated from 3D data from the region surrounding the aorta, for example, during angioplasty, a user can pick a first point 92 on the image 88 by moving the GUI cursor 94 to the region having the point 92 and then clicking the mouse when the cursor 94 is at the desired point 92.

To perform navigation in step 66 of FIG. 3, the user picks the first point 92 and a second point 96, and the view selector system 10 and/or the 3D graphics generator 12, in response to the selection of points 92, 96, automatically generates a path 98; for example, to allow the endoscope using the FLY THROUGH software to travel between the points 92, 96 without pre-segmenting the data of the 3D image 88. The path 98 is calculated based on opacity parameters which the user may pre-set or modify which define the organ or body vessel such as the aorta 88. If the two points 92, 96 are inside a body vessel or passageway such as the esophagus, aorta or intestines, with the opacity settings having been chosen to cause the body vessel 88 to be visible in the 3D rendering of the body vessel 88, then the path 98 selected follows the body vessel 88, within the boundary limits determined in step 62 of FIG. 3. If the opacity settings are chosen which cause the body vessel 88 to be invisible, then the calculated path 98 does not follow the vessel 88 but instead is directed in a substantially straight line from point 92 to point 96, and deviating only to avoid any opaque region between the points 92, 96.

The view selector system 10 also allows for measurement between multiple points 92, 96, as in step 68, for example, the geometric distances between the points 92, 96, the angle formed by multiple points, a minimal non-linear distance between points if opaque regions lie between the points 92, 96, etc. Such measurement techniques are known, with the view selector system 10 determining boundaries which affect such measurement.

The view selector system 10 also allows segmentation to be chosen in step 70 after the boundaries have been determined in step 64. Referring to FIG. 5, having determined the boundaries, the view selector system 10 allows a user to pick a 3D seed point 100 for automatic segmentation to generate a segmented image 102 using, for example, known segmentation techniques such as described in U.S. Pat. No. 5,782,762 and/or U.S. Pat. No. 5,825,909 of Jang, which are incorporated herein by reference.

In addition, the view selector system 10 also allows registration to be chosen in step 71, in which a plurality of data sets are volume-rendered in at least one window on the screen as in FIG. 2, and the user picks corresponding points on the volume-rendered images. The picked points then allow the user to register the two data sets; for example, to modify images by translation or morphing. Registration insures the anatomical coherency of the multiple data sets. Anatomical coherency stipulates that if a point $P_A$ in Volume A corresponds to the same region of the patient as a point $P_B$ in Volume B, then the registered mapping between A and B maintained by the view selector 10 includes such anatomical coherency between data sets.

Certain MR acquisitions are well registered, such as in neuro studies, since the head may be fixed for the duration of the acquisition. However, patient motion may not be avoided during the acquisition of other parts of the body; for example, in peripheral studies that involve movement of the patient table with the patient thereon between different acquisitions. One technique which may be used is automatic rigid body registration, in which a rigid body transformation is performed by the view selector 10 and/or the graphics system 14 to bring multiple studies into registration. For example, a FUSION taskcard included in the task cards 18; that is, the available functions used by the graphics generator 12 with the graphics system 14, can be used for this purpose. Using an interactive selection of corresponding points between two volumetric studies, a fully automatic registration may be performed which matches two studies based on pixel/voxel values, and so to properly be aligned. Such automatic registration is useful in MRA applications, since the nature and pixel/voxel statistics of multiple studies of a common physical structure are very similar. Thus a user and/or automatic registration matching techniques such as neural networks or classifiers may align the images in preparation of further image manipulation, as described above.

Another related technique is interactive volume-rendering-based registration, in which the availability of interactive and real-time volume rendering offers rigid body registration based on visualization. Using such a registration method, two studies may be volume-rendered simultaneously in one or more display windows through the GUI. The user and/or the automatic registration matching techniques including neural networks or classifiers may interactively attempt to maximize the overlap between images. Real-time volume rendering may be used to implement such interactive registration. In an alternative embodiment, transformations which deform one volumetric body to match another to perform automatic warping registration may be used, which may compensate for non-rigid body motions.

Other known medical image registration techniques may be used, such as the maximization of mutual information (MMI) technique, and the iterative closest point (ICP) technique, for matching and manipulating such images using the view selector 10.

In another alternative embodiment, visualization yoking may be performed, in which visualizations of different images can be yoked by which changes occurring or implemented in the viewing parameters in one image of a yoked group of images are automatically applied to the rest of the images in the group. Viewing parameters include window, level, zoom, and pan for 2D viewing; and viewpoint, camera parameters, clip planes, transfer function, etc. for 3D viewing, as well as filtering and other image transforming techniques. A change in a visualization parameter of one image changes the visualization parameter of the remaining yoked images. For example, a change in resolution to zoom in on a portion of a first image may cause the view selector 10 to change the resolution in other images to zoom into a corresponding portion of the respective images.

In another alternative embodiment, interactive measurement and region of interest (ROI) yoking may be performed. When interactive measurements are made on one image of a yoked group, such as distances, areas, volumes, histogram/intensity properties, etc., the same measurements are mirrored on the other members of the group. For histogram/intensity based measures, the result may be different in each volume. ROI selection and the position of pointers or other graphical indicators to features in the images are yoked in a similar manner.

Since boundaries are determined and points may be picked on the volume-rendered image and then performing segmentation, the view selector system 10 allows a user to select objects in the volume-rendered image and then to change the visibility of such objects, such as by fading or rendering invisible the entire object. The user may thus focus on regions of interest without defining cut planes and bounding boxes as is used in known object selection techniques.

With such segmented volumes, the user may also apply colors to different portions of the rendered image. Typically, a specific color is associated with a specific or a defined range of intensity values, with such color assignments used during the volume rendering in step 58. Although different voxels with the same intensity may not be colored differently in known volume rendering techniques, the disclosed viewer selector system 10 allows the user to select the segmented portions of the volume rendered image, such as segment 102 of the image 88 in FIG. 5, and then to have a different color assigned to the segmented regions. Accordingly, different rendered voxels with the same intensity values can be displayed with different colors, which is not performed in known imaging techniques.

The viewer selector system 10 may also be used with two other known types of volume rendering: maximum intensity projection (MIP or MaxIP) and minimum intensity projection (MinIP), with appropriate changes in the boundary/view selector. Such modifications allow the user to choose the method of volume rendering, such as blend, MaxIP, MinIP, etc. along with selectable and adjustable parameters/transfer functions chosen by the user. Such user choices determine a formula to be used to specify the boundary location.

In alternative embodiments, the user may use surface models to pick surfaces on a volume rendered image, such that the mapping 72 in FIG. 4 uses surfaces instead of the ray 86 and/or the user manipulates lines of voxels instead of a picked point such as point 82. In other alternative embodiments, for controlling an endoscope for collision avoidance, the view selector system 10 may determine boundaries with respective force response factors, such that a detected boundary may correspond to a colon wall, and so a remotely manipulated endoscope experiences a collision avoidance force when the simulated endoscope to be displayed in the windows 48–52 contacts a volume rendered boundary or comes within a predetermined distance form the boundary, as determined by the boundary condition criteria described above. Furthermore, since the colon is a body vessel which twists and bends, some of the volume rendered points may be around a bend, so despite being within a predetermined distances, such "around the bend" voxels are not considered boundaries; that is, such voxels are not visible, and so do not exert a collision avoidance force to the endoscope. Accordingly, the collision avoidance forces may be weighted or zeroed out for boundaries not sufficiently near the endoscope, and so not all boundary points contribute to the collision avoidance forces applied to the endoscope.

By the foregoing a novel and unobvious view selector system 10 and method has been disclosed by way of the preferred embodiment. However, numerous modifications and substitutions may be had without departing from the spirit of the invention. For example, while the preferred embodiment discusses a 3D imaging system, it is wholly within the preview of the invention to contemplate multiple-dimensional image and volume rendering with segmentation in the manner as set forth above. Accordingly, the invention has been described by way of illustration rather than limitation.

What is claimed is:

1. A three-dimensional ("3D") imaging system comprising:
    a processor for generating a direct-volume-rendered ("DVR") 3D image on a display using a plurality of voxels from a 3D image dataset;
    an arbitrary-view selector, responsive to user inputs comprising an arbitrary viewing axis, for determining a first set of voxels corresponding to a boundary in the DVR 3D image using a predetermined boundary-specifying criteria applied to a boundary condition of the opacity of the plurality of voxels, wherein the arbitrary-view selector determines the boundary from voxels having opacities greater than a selected threshold; and
    a registration function for registering the DVR 3D image in correspondence with a plurality of DVR 3D images corresponding to a plurality of datasets.

2. The 3D imaging system of claim 1, wherein the processor, responsive to the first set and to a user function selection, performs the selected function to modify the DVR 3D image relative to the detected boundaries.

3. The 3D imaging system of claim 2, wherein the selected function is a display function, with the processor generating and displaying a path on the display between a plurality of selected points on the DVR 3D image.

4. The 3D imaging system of claim 2, wherein the selected function is a measurement function, with the processor determining a measurement value associated with a plurality of selected points on the DVR 3D image.

5. The 3D imaging system of claim 2, wherein the selected function is a segmentation function.

6. The 3D imaging system of claim 5, wherein the segmentation function is performed by the processor by generating a segmented image from the DVR 3D image determined by at least one selected point as a seed point on the DVR 3D image.

7. The 3D imaging system of claim 5, wherein the segmentation function is performed by the processor by generating a segmented image from the entire DVR 3D image representing a single organ currently displayed on the display.

8. The 3D imaging system of claim 5, wherein the segmentation function is performed by the processor by generating a segmented image in response to the user selecting the entire DVR 3D image for segmentation.

9. The 3D imaging system of claim 1, wherein the view selector determines the boundary from voxels having a gradient in opacities greater than a predetermined threshold.

10. The 3D imaging system of claim 1, wherein the view selector determines the boundary from voxels having a greatest contribution to a total Intensity which is a function of the opacities of the voxels.

11. The 3D imaging system of claim 1, wherein the view selector determines the boundary from voxels having respective contributions greater than a predetermined threshold, with such contributions being to a total intensity which is a function of the opacities of the voxels.

12. The 3D imaging system of claim 1, wherein the view selector determines the boundary from voxels having a sum of opacities being greater than a predetermined threshold.

13. The 3D imaging system of claim 1, wherein in the view selector further assigns different colors to respective different rendered voxels with same intensity values in selected regions.

14. A three-dimensional ("3D") imaging system comprising:

a processor for generating a direct-volume-rendered ("DVR") 3D image on a display using a plurality of voxels from a 3D image dataset;

an arbitrary-view selector, responsive to user inputs comprising an arbitrary viewing axis, for determining a first set of voxels corresponding to a boundary in the DVR 3D image using a predetermined boundary-specifying criteria which compares a selected threshold to a boundary condition of the opacities of the plurality of voxels to determine the boundary, wherein the arbitrary-view selector determines the boundary from voxels having opacities greater than a predetermined threshold; and a registration function for registering the DVR 3D image in correspondence with a plurality of DVR 3D images corresponding to a plurality of datasets.

15. The 3D imaging system of claim 14, wherein the view selector determines the boundary using boundary-specific criteria which compares a predetermined threshold to a boundary condition of the opacities and the intensities of the plurality of voxels.

16. A method for determining a boundary in a direct-volume-rendered ("DVR") three-dimensional ("3D") image, the method comprising the steps of:

generating a DVR 3D image on a display from a plurality of voxels from a 3D image dataset using a processor;

receiving voxel values and corresponding opacity values of the plurality of voxels;

determining a first set of voxels responsive to an arbitrary viewing axis and corresponding to a boundary in the DVR 3D image by using a predetermined boundary-specifying criteria applied to a boundary condition of the opacity of the plurality of voxels, wherein the boundary is determined from voxels having opacities greater than a selected threshold; and performing a registration function on a plurality of DVR 3D images corresponding to a plurality of datasets.

17. The method of claim 16, further comprising the step of: performing a function selected by a user using the determined boundary.

18. The method of claim 17, wherein the step of performing the selected function includes the step of: performing a display function, with the processor generating and displaying a path on the display between a plurality of selected points on the DVR 3D image using the determined boundary.

19. The method of claim 17, wherein the step of performing the selected function includes the step of: performing a measurement function, with the processor determining a measurement value associated with a plurality of selected points on the DVR 3D image using the determined boundary.

20. The method of claim 17, wherein the step of performing the selected function includes the step of: performing a segmentation function on the DVR 3D image.

* * * * *